United States Patent
Benson et al.

(10) Patent No.: US 6,905,790 B2
(45) Date of Patent: *Jun. 14, 2005

(54) BATTERY PACK HAVING IMPROVED BATTERY CELL TERMINAL CONFIGURATION

(75) Inventors: Morgan Rey Benson, Indianapolis, IN (US); Steven D Cochran, Fishers, IN (US)

(73) Assignee: Enerdel, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/977,062

(22) Filed: Oct. 29, 2004

(65) Prior Publication Data

US 2005/0058900 A1 Mar. 17, 2005

Related U.S. Application Data

(63) Continuation of application No. 09/918,878, filed on Jul. 31, 2001, now Pat. No. 6,811,902.

(51) Int. Cl.$^7$ ............................................. H01M 14/00
(52) U.S. Cl. ............................. 429/7; 429/178; 429/179
(58) Field of Search .......................... 429/7, 128, 144, 429/162, 181, 174, 177–179, 170, 244, 121–123, 211, 153, 623.4

(56) References Cited

U.S. PATENT DOCUMENTS

| | | |
|---|---|---|
| 5,202,198 A | 4/1993 | Mix et al. |
| 5,639,571 A | 6/1997 | Waters et al. |
| 5,746,781 A | 5/1998 | Velasquez et al. |
| 6,063,519 A | 5/2000 | Barker et al. |
| 6,403,262 B1 | 6/2002 | Xing et al. |
| 6,537,704 B1 | 3/2003 | Akashi et al. |
| 2001/0026888 A1 * | 10/2001 | Yokoyama et al. ......... 429/121 |
| 2001/0051298 A1 | 12/2001 | Hanafusa et al. |
| 2002/0081488 A1 | 6/2002 | Guindy et al. |

* cited by examiner

*Primary Examiner*—Michael Barr
*Assistant Examiner*—Monique Wills
(74) *Attorney, Agent, or Firm*—Akerman Senterfitt

(57) ABSTRACT

A battery pack containing a plurality of battery modules, said modules comprising a plurality of individual battery units, said battery units comprising a plurality of bicells with opposing terminals. The battery modules are connected in series by use of a flexible circuit and by opposing positive and negative terminals of each battery unit. The terminals of each battery unit contain a region of apertures which allow the adhesive of the packaging material to seal more effectively, thereby eliminating or reducing the amount of leakage from an individual battery unit.

2 Claims, 6 Drawing Sheets

BATTERY PACK HAVING IMPROVED BATTERY CELL TERMINAL CONFIGURATION

CROSS REFERENCE TO RELATED APPLICATION

This application is a continuation of U.S. application Ser. No. 09/918,878 filed on Jul. 31, 2001 now U.S. Pat No. 6,811,902.

BACKGROUND OF THE INVENTION

1. Technical Field

The present invention relates to battery packs and components thereof.

2. Description of the Related Art

Conventional lithium polymer soft pack batteries use prismatic or cylindrical cans or rectangular boxes as a package for the battery cells as seen by reference to U.S. Pat. No. 5,639,571 issued to Waters, et al. However, these packages are heavy and expensive, which are disadvantages. In addition, conventional lithium polymer soft pack batteries further use nickel, copper or aluminum terminals to carry current through the package seal to the outside for connection to an overall package connector. These terminals are arranged to exit the same side of the package and are adjacent to each other. The foregoing "same-side" arrangement, however, has shortcomings.

One of the problems involves leaking of the electrolyte solution at a seal point of the terminal to the package. Another problem relates to the orientation of the terminals on the same side. Specifically, the terminals are arranged to exit on the same side of the package and are adjacent to each other, making it difficult to electrically connect the packages in a compact configuration.

There is therefore a need for an improved battery pack that minimizes or eliminates one or more of the problems set forth above.

SUMMARY OF THE INVENTION

It is an object of the present invention to provide a solution to one or more of the above mentioned problems. In one aspect of the present invention, a battery pack is provided that includes a flexible connective circuit containing conductive traces and flaps extending from windows cut from a substrate thereof. One advantage is that these traces and flaps allow for power and control electrical connections between and among a plurality of battery modules in a reduced weight arrangement. Additionally, the flexible circuit allows battery modules to be connected in series (for greater output voltage), or in parallel (for greater ampacity).

According to the first aspect, a battery pack is provided that includes a plurality of battery modules each having at least a positive terminal and a negative terminal associated therewith, and a flexible circuit configured to connect the plurality of positive and negative terminals to an overall output of the battery pack. In a preferred embodiment, each module includes a plurality of individual battery units (sometimes referred to as a "soft pack"), each battery unit including a plurality of bicells.

In a second aspect of the present invention, a pair of terminals associated with a battery unit are located on opposing sides of the battery unit, allowing the battery unit to be rotated one relative to an adjacent one and placed directly thereon. The process can be repeated to form battery modules. This arrangement allows a compact stacking of battery units.

According to the second aspect, a battery unit is provided that includes a (i) plurality of bicells, each bicell containing anodic exposed grids and cathodic exposed grids, the cathodic exposed grids being located across the bicell on the other side of the anodic exposed grids, (ii) a positive terminal, (iii) a negative terminal that is located across the bicell on the other side of the positive terminal, and (iv) a packaging envelope. In a preferred embodiment, a plurality of battery units are each stacked upon the previous battery unit, having been rotated 180 degrees around an axis.

In a third aspect of the present invention, a terminal for a battery unit includes a region that contains through apertures along a length dimension of the terminal. The apertures allow an adhesive or the like to flow through the apertures from a first side to a second side of the terminal to thereby form an improved seal. Additionally, in a preferred embodiment, a convoluted arrangement of apertures is used which presents a corresponding convoluted edge path. Such a path would require an electrolyte solution to travel a further distance before it could leak through the individual battery cell package, thereby reducing or eliminating the occurrence of leaking.

According to the third aspect, a terminal for a battery unit is provided that includes an electrically conductive body portion having a main axis associated therewith, including a first region configured to be adhered to and in electrical contact with exposed bicell grids, a second region extending along the axis and having a plurality of apertures therethrough, a third region encapsulated by an electrical insulating material, and a fourth region configured for electrical connection to a conductor.

Other features, objects, and advantages will become apparent to one of ordinary skill from the following detailed description and accompanying drawing illustrating the invention by way of example but not by way of limitation.

BRIEF DESCRIPTION OF THE DRAWINGS

The present invention will now be described, by way of example, with reference to the accompanying drawings, in which.

DETAILED DESCRIPTION OF A PREFERRED EMBODIMENT

Figure 1:
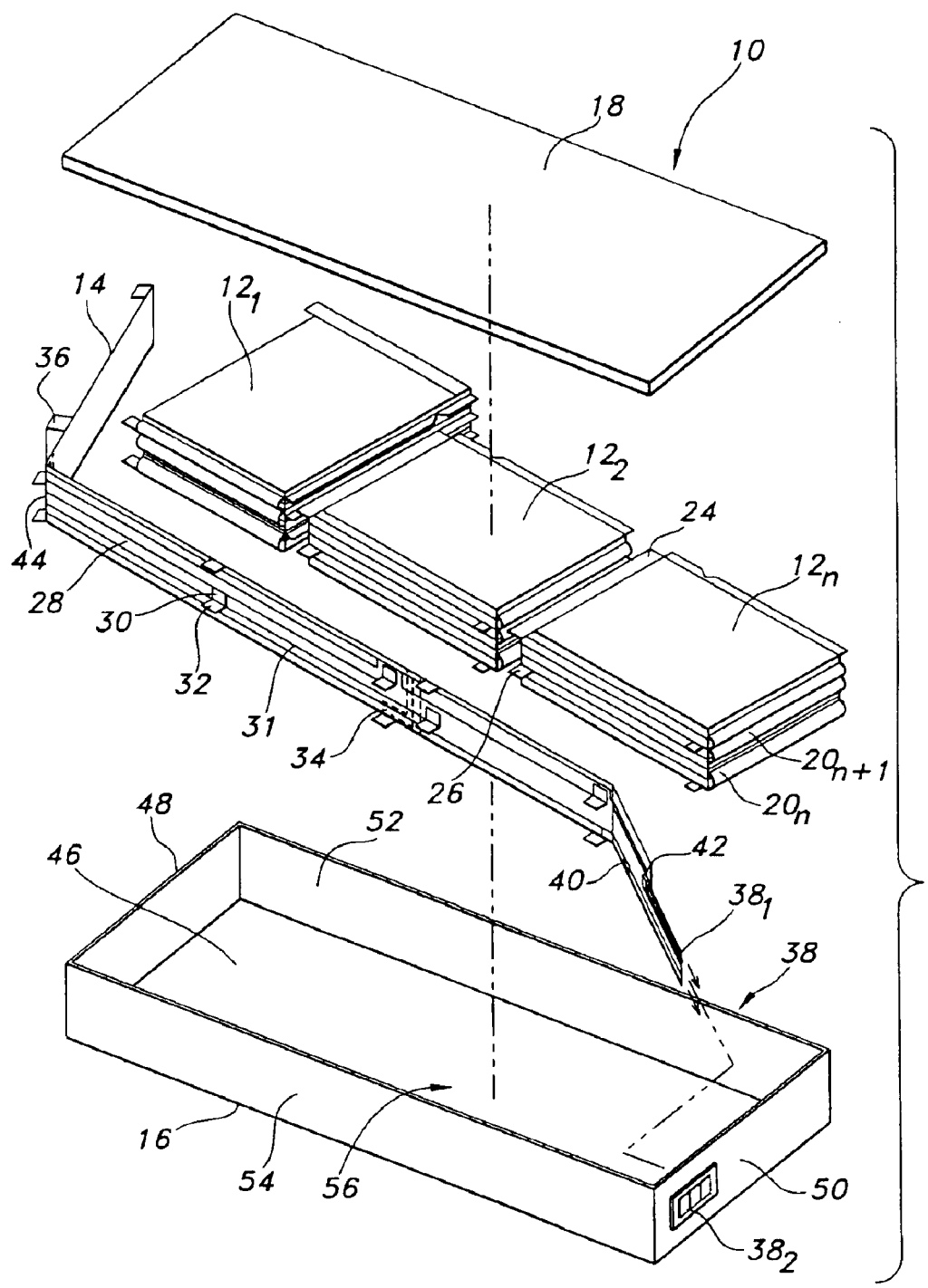
FIG. 1 is an exploded, perspective view of the battery pack having a plurality of battery modules, according to the invention.

Referring now to the drawings wherein like reference numerals are used to identify identical components in the various views, FIG. 1 illustrates an improved battery pack 10 according to the invention. The pack 10 may be used for portable or stationary electrical and/or electronic devices, including commercial apparatus such as medical devices. In addition, to enhance understandability, a general overview of the basic stackup of battery components will be set forth. The basic component of the battery pack 10 is a so-called bicell, as know in the art, for example, by reference to U.S. Pat. No. 6,063,519 issued to Jeremy Barker, et al. A plurality of bicells are arranged, as will be seen, to form a battery unit, sometimes referred to as a soft-pack. A plurality of battery units are arranged together to from a battery modules which has terminals for delivering power. Finally, a plurality of battery modules are arranged to form the overall battery pack. Thus, the progression is as follows: bicell→battery unit→battery module→battery pack.

Battery pack 10 may include a plurality of battery modules $12_1$, $12_2$, to $12_n$, where n is an integer, a flexible circuit 14, and a case 16 with a top 18.

Figure 3:
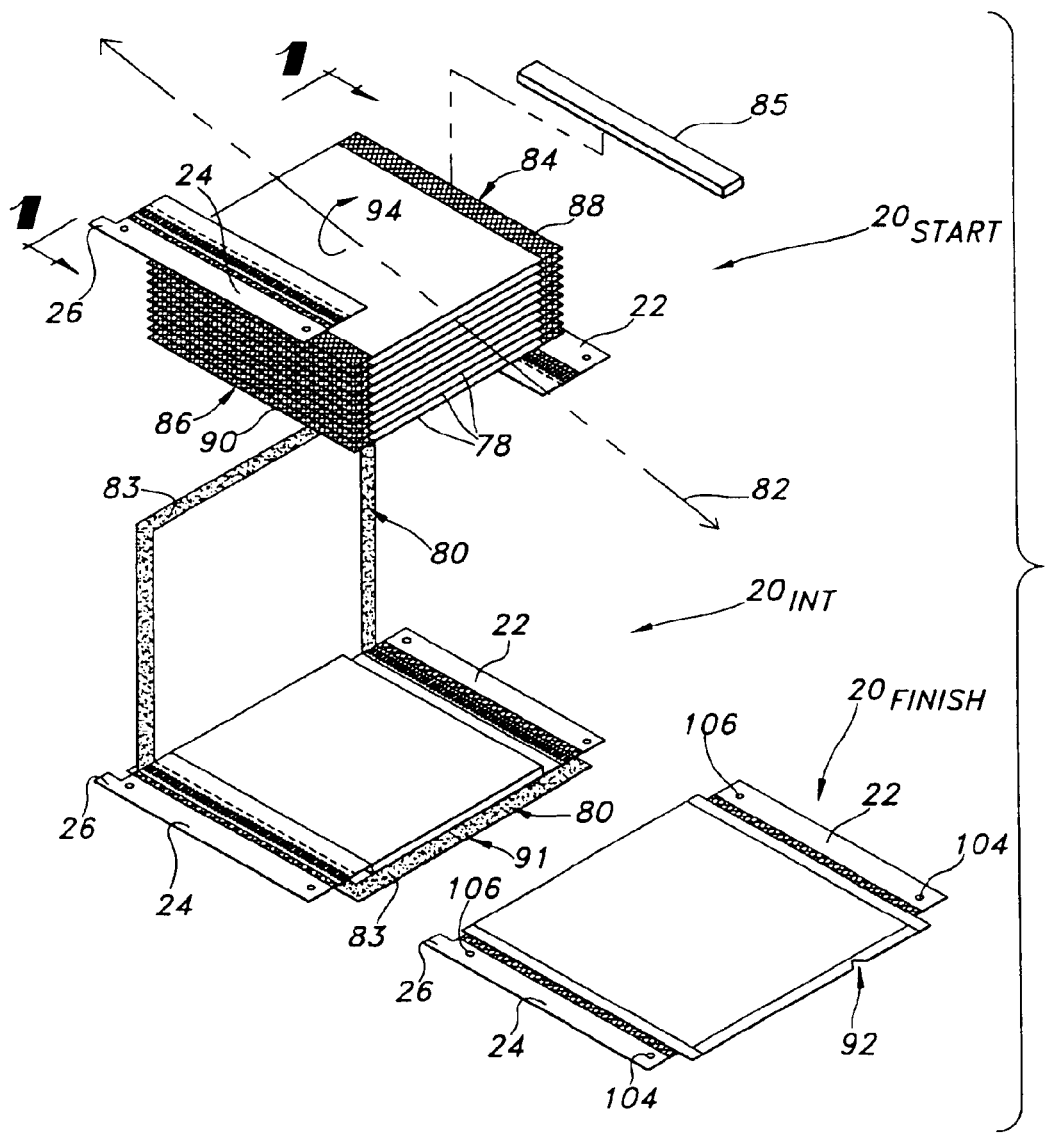
FIG. 3 is a perspective view of an individual battery unit of a battery module.
Figure 4A:
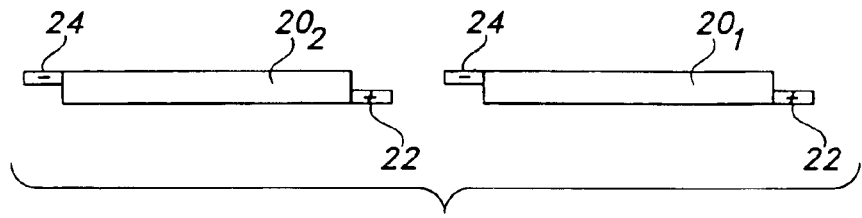
FIGS. 4A–4F shows the creation of an orientation of stacked battery units of a battery module.

The battery modules $12_n$ may be rechargeable lithium polymer (LiPo) battery modules configured to provide electrical power. Other chemistries, such as other lithium chemistries, may also be used. Each battery module $12_n$ may include a plurality of individual battery units 20 (as shown in FIGS. 3–4A–F), one or more positive terminals 22, and one or more negative terminals 24. Each terminal 22, 24 may have a respective tang 26.

The flexible circuit 14 is configured to establish control and power connections between and among the individual battery modules $12_n$, the case 16 and other electronics to be described below. In the illustrated embodiment, flexible circuit 14 couples the battery modules $12_n$ in a series-connected arrangement, and allows electrical power to flow in (charge) and out (discharge) of case 16. In this regard, flexible circuit 14 may include a substrate 28, a plurality of windows 30, a plurality of conductive traces 31, a plurality of flaps 32, and one or more jumpers 34. Flexible substrate 28 may be generally flexible, and may be of a material such as MYLAR® by E. I. Du Pont de Nemours and Company or the like. Substrate 28 is configured to contain a number of conductive traces 31 for establishing the above mentioned connections. Conductive traces 31 may run along the length of the substrate 28 and may be made of copper or another conductive material. Flexible circuit 14 may also include one or more windows 30 cut from substrate 28. Flaps 32 made of a conductive material, such as copper, fold out from windows 30, the conductive material being exposed once one side of the flexible substrate 28 is removed from the cut window 30 and the remaining substrate 28 and conductive material are folded to create window 30 and flap 32. Flaps 32 are electrically connected to conductive traces 31.

Windows 30 may be oversized to allow for thermal expansion of flaps 32 when flaps 32 are electrically connected to terminals 22, 24. In a preferred embodiment, negative terminal 24 of each battery unit 20 is ultrasonically welded to corresponding flap 32 on flexible circuit 14 via tang 26. Other conventional connection methods may be employed. Flexible circuit 14 may also include one or more jumpers 34, which allow the connection of battery modules $12_n$ in a series-connected arrangement. It should be appreciated that jumpers 34 permit connections over conductive traces 31 without being electrically connected to traces 31 themselves.

Flexible circuit 14 may also include a controller connector 36, a pack connector 38, a fuse 40, and a current sensor 42, all of which are elements known to those with ordinary skill in the art. Controller connector 36 provides electrical and mechanical termination of various power and control signals between a controller (best shown in FIG. 2) dedicated to pack 10 and flexible circuit 14. Overall pack connector 38 comprises a pair of mating portions $38_1$ and $38_2$, and provides power and control from inside battery pack 10 to the outside world. Fuse 40 and sensor 42 provide their conventional functions. Particularly, fuse 40 is configured to "open" electrically when a predetermined current (e.g., a DC current) is being sourced by pack 10. Sensor 42 generates a current indicative signal representing the level of DC current being provided by pack 10. Flexible circuit 14 may also include a living hinge 44 which allows flexible circuit 14 to be oriented such that the location of selected windows 30 and flaps 32 can be configured to electrically connect to terminals 22, 24 of end module $12_n$. There may be, however, no hinges or bends or several, depending on the particular design of the case.

FIG. 1 also shows a case 16 and top 18 which cooperate to enclose and protect the interior components of battery pack 10, namely modules 12 and flexible circuit 14. The case 16 includes a bottom 46, two end walls 48, 50 and two side walls 52, 54 which form an interior 56. Interior 56 houses, in effect, modules 12 and flexible circuit 14. Case 16 and top 18 may comprise electrical insulating material, for example a polyester or a plastic.

Figure 2:
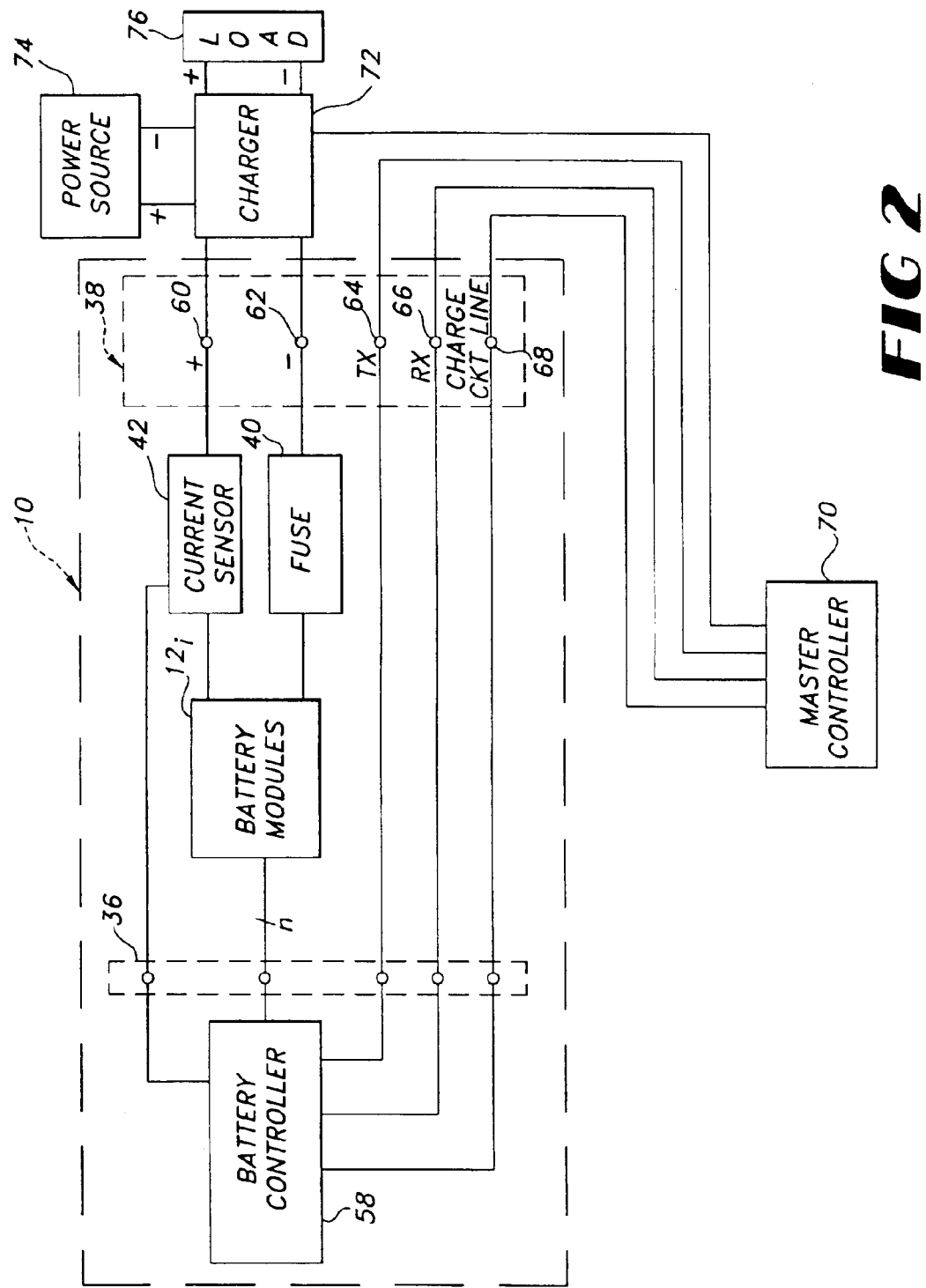
FIG. 2 is a schematic and block diagram view of the battery pack of FIG. 1 coupled to a charger and load.

FIG. 2 shows, in schematic and block diagram form, battery pack 10 in greater detail as employed in a preferred environment, specifically further including a battery controller 58, package connector 38 comprising a positive polarity (+) terminal 60 and a negative polarity (−) terminal 62, communication terminals such as a transmit (Tx) terminal 64 and a receive (Rx) terminal 66, and a control terminal such as a charge circuit line 68. FIG. 2 further shows a master controller 70, a charger 72, a power source 74, and an electrical load 76.

In operation, pack 10 may be used to provide (discharge) power to a load 76 or to receive power (recharge) through a charger 72. Positive polarity terminal 60 is connected to charger 72, which is also connected to current sensor 42. Both charger 72 and current sensor 42 are connected to battery controller 58 through battery controller connector 36. Negative polarity terminal 62 is also connected to charger 72 and fuse 40. Transmit terminal 64 is connected to battery controller 58 through controller connector 36 and to master controller 70 through pack connector 38. Receive terminal 66, which is connected to battery controller 58 through controller connector 36 and is also connected to master controller 70 through pack connector 38. Charge circuit line 68, which is connected to battery controller 58 through controller connector 36, is also connected to master controller 70 through pack connector 38.

When the battery pack is providing power to a load 76, master controller 70 allows the positive and negative polarity terminals 60, 62 to pass through charger 72 to power load 76. When battery pack 10 needs recharging, as determined by master controller 70, the terminal leads 60, 62 are reconfigured so as to be recharged by charger 72 connected to power source 74. Master controller 70 determines charge or recharge configuration dependent upon information supplied by battery controller 58. Voltage information is supplied to battery controller 58 via controller connector 36, which is connected to transmit terminal 64 and receive terminal 66. Transmit terminal 64 and receive terminal 66 send and obtain voltage information about individual battery units 20, individual battery modules 12, and the overall battery pack 10, information which has been collected via the electrical connection of terminals 22, 24 of battery units 20 (plurality of units 20 comprising battery modules 12) to flexible circuit 14 via flaps 32.

In a preferred embodiment, battery units 20 are electrically connected in a series-connected arrangement (shown best by FIG. 4). Each negative terminal 24 of the individual battery units 20 (which is electrically connected to positive terminal 22 of adjacent battery unit 20, connected in series) is electrically connected to flexible circuit 14 via flaps 32. This is accomplished by ultrasonically welding tang 26 of negative terminal 24 to corresponding flap 32 in flexible circuit 14. As previously discussed each flap 32 corresponds to electrically conductive trace 31 running through flexible circuit 14. Traces 31 connect to controller connector 36. Because each battery unit $20_n$ is connected to flexible circuit 14 and adjacent battery unit $20_{n+1}$, a voltage lead for each battery unit $20_n$ is produced, which allows the voltage level of each battery unit $20_n$ to be read individually by battery controller 58. The voltage level information may be transmitted and received, via transmit terminal 64 and receive terminal 66, respectively to overall controller 70. Therefore, both the overall battery pack 10 voltage as well as the voltages of the individual battery cells 20 may be monitored. Positive terminal 22 of the end battery unit 20 is connected to the flexible circuit 14 although positive terminal 22 does not include a tang 26 in this embodiment. This connection is accomplished by ultrasonically welding negative terminal 24 to positive terminal 22 and ultrasonically welding tang 26 of negative terminal 24 to corresponding flap 32 of flexible circuit 14.

Battery controller 58 may be configured to request recharge of battery pack 10 or one or more individual battery units 20 via charge circuit line 68, dependent upon the voltage readings of the individual components and overall battery pack 10. Use of the flexible circuit 14 to electrically connect battery modules 12, allows acquisition of information about each battery unit 20, each battery module 12, and battery pack 10 while providing a reduced-weight arrangement for electrically connecting the individual battery units 20 and battery modules 12.

Connecting battery modules 12 to each other via flexible circuit 14 allows flexibility of battery pack 10 in at least two ways. First, there exists electrical flexibility. Terminals 22, 24 which connect modules 12 to flexible circuit 14 also provide a voltage lead for each individual battery unit 20. Additionally, terminals 22, 24 enable voltage sensing of individual modules 12 and the overall battery pack 10. Moreover, the flex circuit 14 can be configured to couple the plurality of battery modules in parallel, thereby increasing amperage capacity (ampacity). Alternatively, flexible circuit may be configured to couple the plurality of modules in series, thereby increasing output voltage. Still further, the flex circuit can be configured to allow one tier, two tiers, or more of battery modules. The foregoing can be accomplished via appropriate routing and interconnection of traces 31 and/or jumpers.

Second, a mechanical flexibility exists. Due to the flexibility of substrate 28, modules 12 can be oriented easily in various heights, widths, and depths. Flaps 32 in flexible circuit 14 may be oriented to correspond with terminals 22, 24 for electrical connection. The first aspect of the invention shows a battery pack 10 that is simpler to assemble, that uses electrical connections to both connect battery modules 12 and battery units 20 and obtain voltage information about individual modules 12 and battery units 20, and that allows numerous orientations and sizes of the battery pack 10 because of the use of the flexible circuit 14.

In another aspect of the invention, FIG. 3 shows an individual battery unit 20 in greater detail, and in various phases of constructions. A plurality of units 20 make up a module 12. An exploded view is designated $20_{START}$, an intermediate phase of construction is designated $20_{INT}$, and a finished phase of construction is designated $20_{FINISH}$. FIG. 3 shows a plurality of bicells 78, a packaging envelope 80, an axis 82, adhesive layer 83, a first side of the battery unit 84, a second opposing side of the battery unit 86, a cover strip 85, positive polarity exposed grids 88, and negative polarity exposed grids 90, a vent 92, and a direction of rotation 94 relative to axis 82.

Bicells 78 may comprise conventional bicells known to those of ordinary skill in the art, for example as seen by reference to U.S. Pat. No. 6,063,519, issued to Barker, et al., hereby incorporated by reference. As to the present invention, bicells 78 of battery unit 20 are connected in a parallel electrical relationship. The exposed grids 88, 90 are current carriers. The cathodic grids 88 are ultrasonically welded together leaving just an overall top and bottom surface thereof exposed. The anodic grids 90 are ultrasonically welded together leaving just an overall top and bottom surface exposed.

As described in the Background, a problem with conventional arrangements (i.e., terminals on the "same side" of a battery unit), is that it becomes more difficult to connect multiple battery units in a compact, series-connected arrangement. According to the invention, each individual battery unit 20 has a positive terminal 22 located at a first end 84 of the battery unit 20 and a negative terminal 24 located at a second end 86. The second end 86 is located on an opposing side of battery unit 20 from first end 84, relative to a horizontal axis 82. In the illustrated embodiment, negative terminal 24 is ultrasonically welded to the remaining exposed top surface of anodic grids 90. In the illustrated embodiment, the positive terminal 22 is ultrasonically welded to the remaining exposed bottom surface of cathodic grids 88. The cover strip 85 is made of the same material as the corresponding terminal (positive or negative) 22, 24 and grid (positive or negative) 88, 90 and is placed above the grids 88, 90 or below the grids 88, 90, depending upon whether the terminal 22, 24 is either welded on the top of the stack of grids 88, 90 or below the stack of grids 88, 90. That is, the cover strip is placing on the opposing side relative to the terminal. That way, an electrosonic welding horm has opposing, reaction surfaces to grip. The strips minimize damage to the relatively fragile grid portion during welding.

The plurality of bicells 78 is enclosed in packaging envelope 80. Packaging envelope 80 may comprise a single sheet which is folded to enclose the bicells 78. Packaging envelope 80 may be a type of laminated, aluminized flexible material which contains four layers. The outside layer exposed to the environment is an electrical insulating material, for example, a polyester. The next underlying layer is metallic, for example, aluminum. This metallic layer reduces or eliminates the amount of moisture outside of the packaging envelope 80 to which the battery unit 20 is exposed (i.e., provides a bidirectional moisture barrier). The third layer is of the same material as the outside layer. The fourth layer, layer 83, comprises an adhesive such as a conventional sealing hot melt adhesive, for example ethylene acrylic acid (EAA). The part of a sheet of packaging envelope 80 is placed under the individual battery unit 20 and a remaining part of the packaging envelope 80 is folded over the battery unit 20 such that the hot melt adhesive layer 83 comes in contact with itself in three locations. It comes in contact with itself on a first end 84 and a second end 86 and edge 91 along the axis of the fold. Packaging envelope 80 contains a vent 92, which allows any gas due to overcharging or other conditions to escape.

In another aspect of the present invention, opposing terminals 22, 24 allow the individual battery units 20 to be bussed as battery modules 12 in a compact form. An individual battery unit 20 can be rotated around horizontal axis 82 in a clockwise direction 94 by 180 degrees and placed on top of another battery unit 20.

Figure 4B:
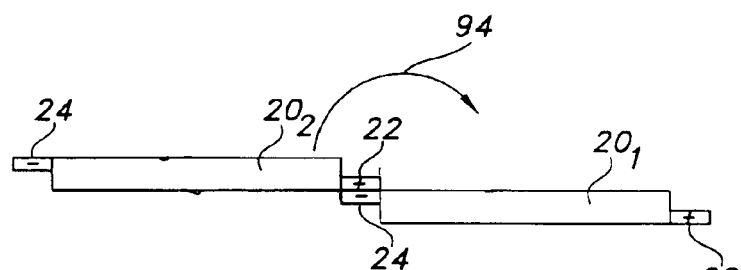
Figure 4C:
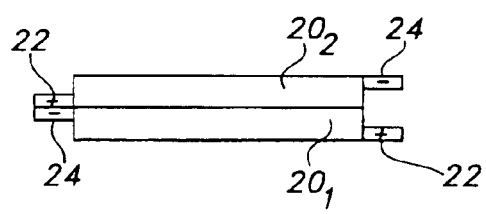
Figure 4D:
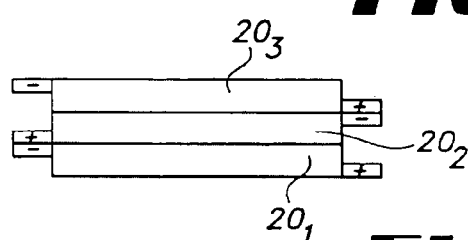
Figure 4E:
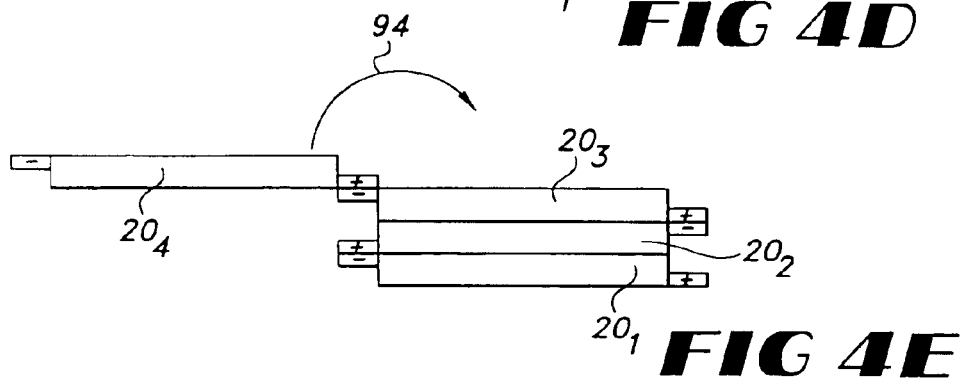
Figure 4F:
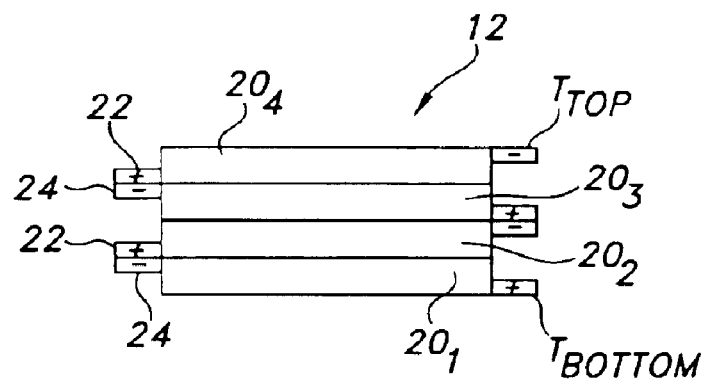

FIGS. 4A through 4F show one construction process for a preferred embodiment of the invention. A first battery unit $20_1$, and additional battery units 20, are configured the following way. Positive terminals 22 (e.g., aluminum) and negative terminals 24 (copper) of battery units 20 are oriented such that negative terminal 24 is electrically connected to the top surface of ultrasonically welded anodic exposed grids 90 and positive terminal 22 is electrically connected to the bottom surface of the ultrasonically welded cathodic exposed grids 88. A second battery unit $20_2$ is placed adjacent first battery unit $20_1$ (FIG. 4A) such that positive terminal 22 on bottom surface of second battery unit $20_2$ is electrically connected to negative terminal 24 on top surface of first battery unit $20_1$ (FIG. 4B). Second battery unit $20_2$ is rotated clockwise about 180 degrees 94 around horizontal axis 82 such that negative terminal 24 of second battery unit $20_2$ is oriented above positive terminal 22 of first battery unit $20_1$ (FIG. 4C). A third battery unit $20_3$ may be placed on second battery unit $20_2$ such that positive terminal 22 on bottom surface of third battery unit $20_3$ is electrically connected to negative terminal 24 on top surface of second battery unit $20_2$ (FIG. 4D). No rotation 94 of third battery unit $20_3$ is required. A fourth battery unit $20_4$ may be oriented as second battery unit $20_2$ such that positive terminal 22 on bottom surface of fourth battery unit $20_4$ is electrically connected to negative terminal 24 on top surface of third battery unit $20_3$ (FIG. 4E). Fourth battery unit $20_4$ is rotated clockwise about 180 degrees 94 around horizontal axis 82 such that negative terminal 24 of fourth battery unit $20_4$ is oriented above positive terminal 22 of third battery unit $20_3$ and first battery unit $20_1$ (FIG. 4F). This "stacking" of successive battery units 20 can be repeated for a plurality of battery units 20. Note, in a constructed embodiment, positive terminal 22 does not generally include a tang 26. However, respecting FIG. 4F, the bottom terminal designated $T_{BOTTOM}$, may include a tang electrically connected thereto so as to facilitate connection to flexible circuit 14. The overall positive terminal of module 12 in $T_{BOTTOM}$, while the overall negative terminal of module 12 is designated $T_{TOP}$. Each node, it should be appreciated, also includes at least one tang, owing to the presence of a negative terminal. This allows voltage sensing for each unit 20.

By placing negative terminal 22 on a second end 86 opposing positive terminal 24 with respect to a horizontal axis 82, a more compact stacking of battery units 20 to create a battery module 12 is available. This is another aspect of the invention.

Figure 5:
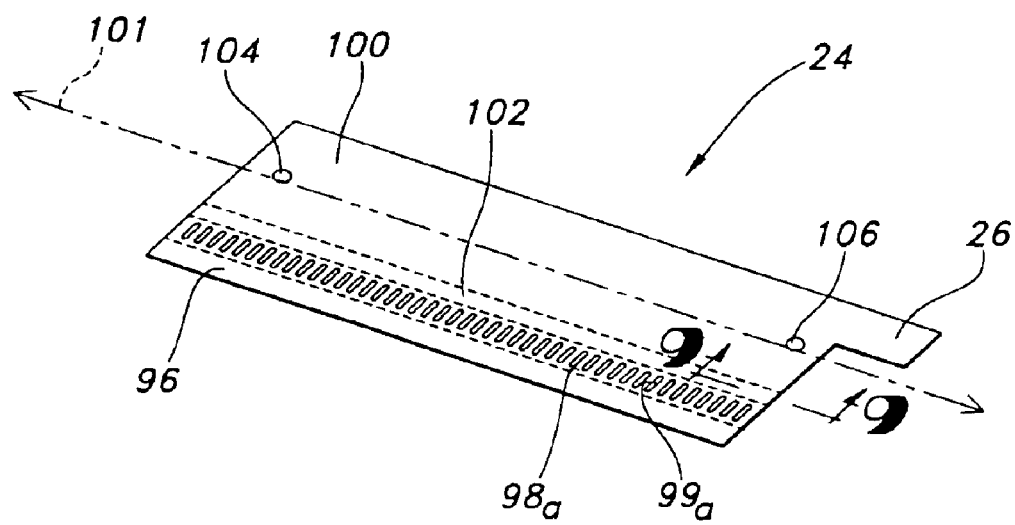
FIG. 5 is a perspective view showing, in greater detail, the terminal of FIG. 3.

In another aspect of the invention, FIG. 5 shows terminal 24 in greater detail. Terminal 24 comprises an electrically conductive tab and may be formed of copper or aluminum material. Terminal 24 allows individual battery unit 20 to be electrically connected to another individual battery unit 20, the flexible connection 14, or another electrical connection. The terminal 24 has a first region 96, a second region 98 having apertures $99_a$, a third region 100, a fourth region 102, a first locating hole 104 and a second locating hole 106. In the illustrated embodiment, terminal 24 has a tang 26 protruding from one edge of third region 100 along a lengthwise axis 101. The first region 96 may be welded to the exposed grids 90 of the plurality of bicells 78.

In a first embodiment, apertures $99_a$ in region $98_a$ are arranged in a repeating pattern and comprise a standard slot, I-shape through aperture. This allows adhesive to flow therethrough.

Figure 6:
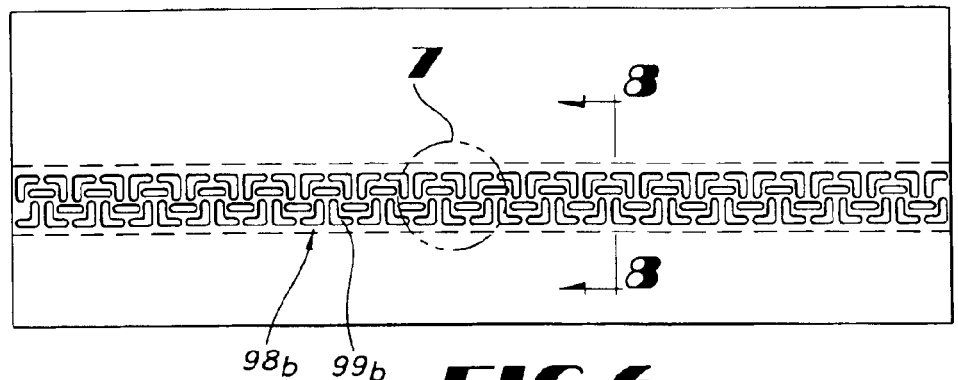
FIG. 6 is a perspective view showing, in greater detail, apertures of FIG. 5.

FIG. 6 shows a second embodiment of second region, designated $98_b$. The second region $98_b$ contains apertures $99_b$ cut through terminal 24. In the illustrated embodiment, apertures $99_b$ run substantially the length of terminal 24. Packaging envelope 80 seals to itself through the apertures of second region $98_b$ at the sides 84, 86 because of the hot melt adhesive flows from above and below the apertures $98_b$ to adhere to itself The apertures $98_b$ reduce or eliminate leaks of electrolyte solution from bicells 78 in at least two ways. First, the apertures $98_b$ allow packaging envelope 80 to more effectively seal because the hot melt adhesive binds with itself. Second, the design of the apertures $98_b$ creates a convoluted path by which the electrolyte solution must travel in order to leak from bicell 78.

Figure 7:
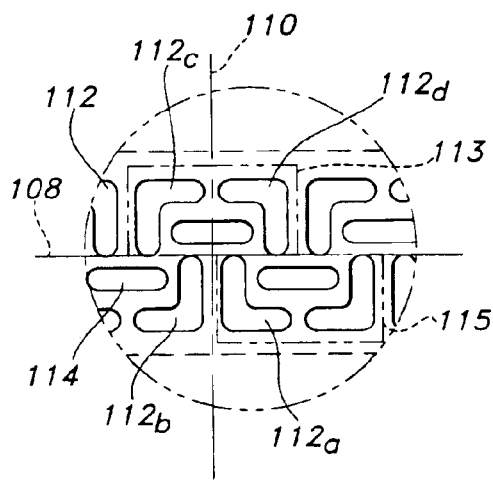
FIG. 7 is an enlarged view of a preferred pattern for the apertures of FIG. 6.

FIG. 7 shows an enlarged view of a repeating pattern of apertures $98_b$ referred to in the encircled region designated "7" in FIG. 6. FIG. 7 shows a first axis 108, a transverse axis 110, L-shaped apertures 112, and I-shaped apertures 114. I-shaped apertures 114 are cut along a horizontal axis 108. I-shaped apertures 114 are located between sets of L-shaped apertures 112, wherein the long leg of the L-shaped aperture is located along the direction of transverse axis 10. There may be four orientations of L-shaped apertures $112_a$, $112_b$, $112_c$, $112_d$. A first orientation $112_a$ is oriented as the letter "L" in the conventional manner. A second orientation $112_b$ is the mirror image of the first orientation $112_a$, the image being reflected with respect to transverse axis 110. This second orientation resembles a backward letter "L". A third orientation $112_c$ is the mirror image of $112_a$, the image being reflected through horizontal axis 108. A fourth orientation $112_d$ is the mirror image of second orientation $112_b$, the image being reflected through horizontal axis 108. As viewed along transverse axis 110, a first pattern 113 is located above a second pattern 115. As described along horizontal axis 108, first pattern 113 may include one third orientation L-shaped aperture $112_c$, followed by one fourth orientation L-shaped aperture $112_d$. Between the long legs of two L-shaped apertures $112_c$, $112_d$ is located one I-shaped aperture 114 aligned along the horizontal axis 108. As described along horizontal axis 108, second pattern 115 may include one first orientation L-shaped aperture $112_a$, followed by a second orientation L-shaped aperture $112_b$. Between the long legs of the two L-shaped apertures $112_a$, $112_b$ is located one I-shaped aperture 114 aligned along the horizontal axis 108.

Figure 8:
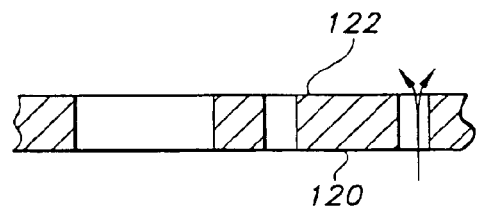
FIG. 8 is a section view taken substantially along lines 8—8 of FIG. 6, showing, in greater detail, the cut-through pattern of the perforated area of the terminal.

FIG. 8 is a section view taken substantially along lines 8—8 in FIG. 6 and shows a first side 120 and a second side 122 of terminal 24 in second region 98. This better illustrates how the apertures 98, allow the hot melt adhesive of the packaging 80 to seal with itself.

Figure 9:
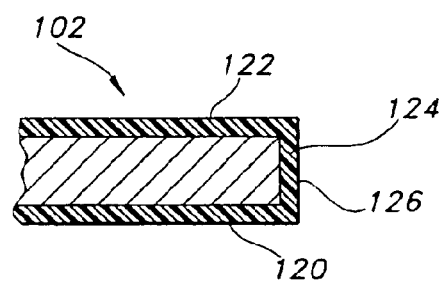
FIG. 9 is a section view taken substantially along lines 9—9 of FIG. 5, showing, in greater detail, a region enclosed by an insulator.

FIG. 9 is a section view taken substantially along lines 9—9 in FIG. 5 and shows an electrical insulator 124 applied to the fourth region 102 of the terminal 24. Insulator 124, such as a polyester, may be applied in the form of a tape or may be applied at the time of manufacture of terminal 24. These methods are known to those of ordinary skill in the art. Insulator 124 is applied to first side 120 of terminal 24, second side 122 of terminal 24, and edge 126 of terminal 24. Placement of insulator 124 reduces or eliminates shorting of terminal 24 that could be created if terminal 24 comes in contact with the aluminum layer of packaging envelope 80.

Terminal 24 may contain first locating hole 104 and second locating hole 106. These holes 104, 106 may aid in welding of terminal 24 to exposed grids 88, 90 of plurality of bicells 78 and manufacture of battery unit 20 by aiding in alignment of components for sealing.

It should be understood that although FIG. 5 illustrates tang 26, tang 26 is not required for the invention. In a preferred embodiment, positive terminal 22 excludes tang 26, and negative terminal 24 includes tang 26, tang 26 being the location of electrical connection of battery units 20 to flexible circuit 14.

Terminal 24 (including or excluding tang 26) aids in the sealing of packaging envelope in at least two ways. Apertures $99_a$, $99_b$ allow hot melt adhesive of packaging envelope 80 to seal to itself. Further, apertures $99_b$ create a convoluted path, making it more difficult for electrolytic solution to leak from packaging envelope 80. In one embodiment, terminal 24 may include a tang 26 that aids in connection of battery unit 20 to flexible circuit 14. Terminal 24 is another aspect of the invention.

What is claimed is:

1. A battery unit, comprising:
   a plurality of bicells wherein each bicell contains anodic exposed grids at a first end of said bicell and cathodic exposed grids at a second end of each bicell, said second end opposing said first end relative to a horizontal axis;
   at least one cover strip configured to be in contact with said cathodic exposed grids;
   a positive terminal wherein said positive terminal is configured to be in connection with said cathodic exposed grids;
   a negative terminal wherein said negative terminal is configured to be in connection with said anodic exposed grids; and
   a packaging envelope configured to enclose said bicells, said packaging envelope comprising a single sheet of laminated, aluminized flexible material,
   wherein one of said terminals further comprise a tang.

2. A battery pack, comprising:
   at least one battery module, wherein said battery module comprising,
      a plurality of battery units configured such that said plurality may be stacked;
      positive terminals each located at a first end of the battery unit extending in a first direction from said battery unit, a first number of positive terminals being equal to the number of said plurality of battery units;
      negative terminals each located at a second end of the battery unit, said second end opposing said first end relative to a horizontal axis, said negative terminals extending from said battery unit in a second direction opposite to said first direction, a second number of negative terminals equal to the number of said plurality of battery units; and
      a packaging envelope for each one of said battery units, said packaging envelope comprising a single sheet of laminated, aluminized flexible material;
   a flexible circuit electrically connected to said at least one battery module, wherein said flexible circuit comprising a substrate, at least one window, at least one conductive trace, at least one flap, and at least one jumper; and
   a case housing said at least one battery module and said flexible circuit.

* * * * *